United States Patent
Strong et al.

[15] 3,678,070
[45] July 18, 1972

[54] 4-OXOPERHYDROBENZO[B] THIOPHENES AND THEIR PREPARATION

[72] Inventors: Jerry G. Strong, Westfield; Harold A. Kaufman, Piscataway, both of N.J.

[73] Assignee: Mobil Oil Corporation

[22] Filed: April 28, 1969

[21] Appl. No.: 819,982

[52] U.S. Cl. ............. 260/332.3 P, 260/330.5, 424/275
[51] Int. Cl. ................................. C07d 63/04, C07d 63/08
[58] Field of Search ................. 260/332.3 P, 332.8, 330.5

[56] References Cited

UNITED STATES PATENTS 3,317,552  5/1967  Kaufman et al. ................. 260/304

OTHER PUBLICATIONS

Lautenschlaeger, J. Org. Chem. 1968: 33(7), 2620– 7.

*Primary Examiner*—Henry R. Jiles
*Assistant Examiner*—Cecilia M. Shurko
*Attorney*—Oswald G. Hayes, Andrew L. Gaboriault and Hastings S. Trigg

[57] ABSTRACT

Alkyl-substituted 4-oxoperhydrobenzo[b]thiophenes are produced by reacting 2-allyl-2-cyclohexen-1-one, or a derivative having an alkyl substituent on the side chain, with hydrogen sulfide at ambient temperatures. The products can be dehydrogenated to produce 4-hydroxybenzo[b]-thiophene derivatives and converted to carbamate insecticides.

6 Claims, No Drawings

4-OXOPERHYDROBENZO[b]THIOPHENES AND THEIR PREPARATION

BACKGROUND OF THE INVENTION

1. Field of the Invention

This invention is concerned with novel alkyl-substituted 4-oxoperhydrobenzo[b]ethiophenes and their preparation.

2. Description of the Prior Art

Insofar as is now known, the process of this invention and the products thereof have not been described in the prior art.

SUMMARY OF THE INVENTION

This invention provides 4-oxoperhydrobenzo[b]thiophene having the formula:

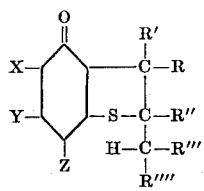

wherein R, R', R'', R''', R'''' are hydrogen or an alkyl ($C_1$–$C_3$) and X,Y,Z, are hydrogen or alkyl ($C_1$–$C_3$).

It also provides a method for producing the 4-oxoperhydrobenzo[b]thiophenes that comprises reacting a compound having the formula:

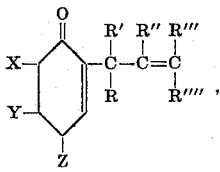

wherein R, R', R'', R''', R'''', X, Y, and Z are hydrogen or an alkyl $C_1$–$C_3$), with hydrogen sulfide at ambient temperature.

DESCRIPTION OF SPECIFIC EMBODIMENTS

In this specification and in the Claims, the term, "4-oxoperhydrobenzo[b]thiophene," is used to indicate fully saturated 4-oxobenzo[b]thiophene, i.e., 2,3,3a,4,5,6,7,7a-octahydro-4-oxobenzo[b]thiophene. a-octahydro-4-oxobenzo[b]thiophene. This nomenclature is used for the sake of brevity and is authorized by Rule A-23.1 of the International Union of Pure and Applied Chemistry.

Non-limiting examples of the alkyl-substituted 4-oxoperhydrobenzo[b]thiophenes of this invention are:
2-methyl-4-oxoperhydrobenzo[b]thiophene;
2,2-dimethyl-4-oxoperhydrobenzo[b]thiophene;
2-methyl-2-ethyl-4-oxoperhydrobenzo[b]thiophene;
2-methyl-2-propyl-4-oxoperhydrobenzo[b]thiophene;
2-ethyl-4-oxoperhydrobenzo[b]thiophene;
2-methyl-2-isopropyl-4-oxoperhydrobenzo[b]thiophene;
2-isopropyl-4-oxoperhydrobenzo[b]thiophene;
2-propyl-4-oxoperhydrobenzo[b]thiophene;
2-propyl-3-methyl-4-oxoperhydrobenzo[b]thiophene;
2,3-dimethyl-4-oxoperhydrobenzo[b]thiophene;
2-methyl-3-ethyl-4-oxoperhydrobenzo[b]thiopene;
2-methyl-3-propyl-4-oxoperhydrobenzo[b]thiophene;
2,3,3-trimethyl-4-oxoperhydrobenzo[b]thiophene;
2,2,3-trimethyl-4-oxoperhydrobenzo[b]thiophene;
2,3-dimethyl-3-ethyl-4-oxoperhydrobenzo[b]thiophene;
2-methyl-3,3-diethyl-4-oxoperhydrobenzo[b]thiophene; and
2,2-dimethyl-3-ethyl-4-oxoperhydrobenzo[b]thiophene.

One of the starting reactants for preparing the compounds of this invention is a compound having the formula:

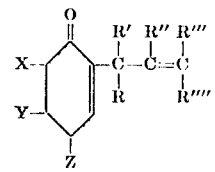

wherein R, R', R'', R''', R'''', X, Y, and Z are hydrogen or an alkyl ($C_1$–$C_3$). Such reactant compounds are 2-allyl-2-cyclohexen-1-one and derivatives thereof having alkyl ($C_1$–$C_3$) substituents on the allyl side chain. For simplicity and uniformity in nomenclature the derivatives will be named on the basis of the allyl side chain. Typical reactant compounds contemplated are:
2-allyl-2-cyclohexen-1-one;
2-methallyl-2-cyclohexen-1-one;
2-(2-ethylallyl)-2-cyclohexen-1-one;
2-(2-propylallyl)-2-cyclohexen-1-one;
2-(3-methylallyl)-2-cyclohexen-1-one;
2-(2,3,3-trimethylallyl)2-cyclohexen-1-one;
2-(2,3-dimethylallyl)-2-cyclohexen-1-one;
2-(3,3-dimethylallyl)-2-cyclohexen-1-one;
2-(3-ethylallyl)-2-cyclohexen-1-one;
2-(2-methyl-3-ethylallyl)-2-cyclohexen-1-one;
2-(1-methylallyl)-2-cyclohexen-1-one;
2-(1-methyl-1-ethylallyl)-2-cyclohexen-1-one;
2-(1,2-dimethylallyl)-2-cyclohexen-1-one;
2-(1-ethylallyl)-2-cyclohexen-1-one;
2-(1,1-diethylallyl)-2-cyclohexen-1-one;
2-(1,1-dimethylallyl)-2-cyclohexen-1-one; and
2-(1-propylallyl-2-cyclohexen-1-one.

These compounds are readily prepared by reacting 2-cyclohexen-1-one with allyl alcohol or an alkyl substituted derivative thereof. The reaction involves distilling a reaction mixture containing the 2-cyclohexen-1-one, the allyl alcohol, 2,2-dimethoxypropane (commercially available), an acid catalyst, and a solvent, such as benzene. The procedures are described by Lorrette and Howard, J. Org. Chem., 26, 3112 (1961). The following examples demonstrate the procedures involved.

EXAMPLE 1

Synthesis of 2-allyl-2-cyclohexen-1-one.

A solution containing 500 g. (5.2 mole) of 2-cyclohexen-1-one, 675 g. (11.6 mole) of allyl alcohol, 600 g. (5.8 mole) of acetone dimethyl ketal, 0.5 g. of p-toluenesulfonic acid and 2.0 l. of dry benzene was distilled through a 3 ft. spinning band column operated at atmospheric pressure and a reflux ratio of 5–8. After 675 ml. of distillate (benzene, methanol, acetone) had been collected at 55°–60°, the reflux ratio was decreased to 3 and 2350 ml. of benzene and allyl alcohol was distilled at 75°–76 (pot temperature increased to 125°). Distillation of the remaining dark liquid was then continued at reduced pressure to afford a forerun (70 g.) of allyl alcohol, 2-cyclohexen-1-one and others followed by 354 g. (2.6 mole; 50 percent) of 2-allyl-2-cyclohexen-1-one: Bp 96– 100 (17 mm.). The pot temperature was never allowed to exceed 125°.

Anal. Calcd. for $C_9H_{12}O$: C, 79.37; H, 8.88.

Found: C, 79.61; H, 8.92.

EXAMPLE 2

Synthesis of 2-methallyl-2-cyclohexen-1-one

The reaction of 793 g. (11.0 mole) of methallyl alcohol and 573 g. (5.5 mole) of acetone dimethyl ketal with 480 g. (5.0 mole) of 2-cyclohexen-1-one in 2 l of benzene containing 0.6 g. of p-toluenesulfonic acid was carried out as in Example 1. Distillation of the reaction product mixture afforded 250 g. (1.7 mole, 34 percent) of 2-methallyl-2-cyclohexen-1-one: Bp 75°–78 (1.5 mm.).

Anal. Calcd. for $C_{10}H_{14}O$: C, 79.95;
H, 9.39.

Found: C, 80.13;
H, 9.53.

The 4-oxoperhydrobenzo[b]thiophene compounds of this invention are prepared by reacting 2-allyl-2-cyclohexen-1-one, or an alkyl substituted derivative thereof, with hydrogen sulfide at ambient temperatures. It is advantageous to use pressure, although atmospheric pressures have been used successfully.

It is advantageous to use a non-polar solvent for the cyclohexenone reactant, such as benzene, toluene, or xylene, or polar solvents, such as lower alcohols. The reaction is carried out in the presence of a basic catalyst. Suitable catalysts include inorganic bases, such as sodium hydroxide and potassium hydroxide; amines, such as triethylamine; and organic bases, such as benzyltrimethylammonium methoxide, benzyltrimethylammonium hydroxide, and sodium alkoxide.

EXAMPLE 3

A stream of hydrogen sulfide gas was intermittently passed through a stirred solution containing 68 g. (0.5 mole) of 2-allyl-2-cyclohexen-1-one and 100 g. (1.0 mole) of triethylamine in 600 ml. of benzene for 5 days at ambient temperatures. The solvents were flash evaporated, and the remaining organic liquid was distilled through a 4-inch Vigreux column to provide 47 g. (0.28 mole: 56 percent) of 2-methyl-4-oxoperhydrobenzo[b]thiophene: Bp 88°–91° (0.05 mm.), λ (film) 5.83 (S)μ; δ(CDCl₃) 4.2 to 1.4 (11H), 1.3 (3H, center of doublet of doublets); m/e 170.

Anal. Calcd. for $C_9H_{14}OS$:  C, 63.48;
H, 8.29;
S, 18.83.

Found: C, 63.27;
H, 8.29;
S, 19.03.

EXAMPLE 4

The addition of hydrogen sulfide to 30 g. (0.2 mole) of 2-methallyl-2-cyclohexen-1-one in 40 g. of triethylamine and 300 ml. of benzene was accomplished in ten days according to the procedure described in Example 1. The crude organic product was distilled through a short path apparatus to furnish 14 g. (0.08 mole) of 2,2-dimethyl-4-oxoperhydrobenzo[b]-thiophene: Bp 97°–98° (0.04 mm.), λ (film) 5.83 (S)μ; δ(CDCl₃) 3.9 to 1.6 (10H), 1.44 (6H, center of doublet); m/e, 184.

Anal. Calcd. for $C_{10}H_{16}OS$:  C, 65.17;
H, 8.75;
S, 17.40.

Found: C, 65.41;
H, 8.88;
S, 17.28.

EXAMPLE 5

A stream of hydrogen sulfide gas was slowly passed through a stirred solution containing 30 g. (0.2 mole) of 2-methallyl-2-cyclohexen-1-one in 30 g. of triethylamine and 300 ml. of methanol. An ice bath was required to maintain the temperature at 25°. After four hours, the solvents were removed by distillation, and the organic residue was mixed with ether. The ethereal solution was washed with 5 percent sodium hydroxide and with brine, dried, and concentrated to afford 28 g. (0.16 mole) of 2,2-dimethyl-4-oxoperhydrobenzo[b]thiophene. This product was identical to the distilled product described in Example 4.

The 4-oxoperhydrobenzo[b]thiophene compounds of this invention are dehydrogenated to produce 4-hydroxy-2,3-dihydro-3-(and 2-)alkylbenzo[b]thiophenes. The dehydrogenation can be carried out in the vapor phase, in the absence of added hydrogen, using water in the feed and a metal oxide catalyst of Groups VI B and VIII (iron sub-group) metals, as defined in U.S. Pat. No. 3,345,382. The dehydrogenation can also be carried out in the liquid phase by applying the procedures of U.S. Pat. No. 3,317,552, i.e., heating a solution of elemental sulfur and the oxo-compound in a solvent for both the sulfur and the oxo compound.

The resulting 4-hydroxy compounds can be converted to carbamate insecticides and pesticides. Typically, the carbamates are formed by reacting the hydroxy compound with an isocyanate, such as alkylisocyanate, or with phosgene and then with an amine.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. 4-Oxoperhydrobenzo[b]thiophene having the formula:

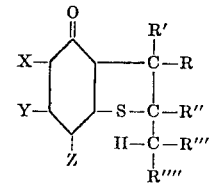

wherein R, R′, R″, R‴, and R⁗ are hydrogen or an alkyl ($C_1$–$C_{3a8}$) and X, Y, Z are hydrogen or alkyl ($C_1$–$C_3$).

2. A compound of claim 1, wherein R, R′, R″, R‴, R⁗, X, Y, and Z are hydrogen.

3. A compound of claim 1, wherein R″ is methyl and R, R′, R‴, R⁗, X, Y, and Z are hydrogen.

4. A method for producing the 4-oxoperhydrobenzo[b] thiophene that comprises reacting a compound having the formula:

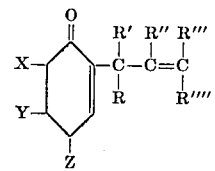

wherein R, R′, R″, R‴, R⁗, X, Y, and Z are hydrogen or an alkyl ($C_1$–$C_3$), with hydrogen sulfide at ambient temperature.

5. The method of claim 4, wherein R, R′, R″, R‴, R⁗, X, Y, and Z are hydrogen.

6. The method of claim 4, wherein R″ is methyl and R, R′, R‴, R⁗, X, Y, and Z are hydrogen.

* * * * *

PO-1050
(5/69)

UNITED STATES PATENT OFFICE
CERTIFICATE OF CORRECTION

Patent No. 3,678,070          Dated July 18, 1972

Inventor(s) JERRY G. STRONG and HAROLD A. KAUFMAN

It is certified that error appears in the above-identified patent and that said Letters Patent are hereby corrected as shown below:

Column 1, line 7, change "ethiophenes" to --thiophenes--

Column 1, lines 51 and 52, "a-octahydro . . . thiophene" should be omitted.

Column 4, line 39, change "$(C_1-C_{3a8})$" to --$(C_1-C_3)$--

Signed and sealed this 19th day of December 1972.

(SEAL)
Attest:

EDWARD M. FLETCHER, JR.
Attesting Officer

ROBERT GOTTSCHALK
Commissioner of Patents